J. R. SAYLOR.
TURRET MACHINE FOR REAMING AND TAPPING.
APPLICATION FILED AUG. 2, 1911.

1,048,352.

Patented Dec. 24, 1912.
10 SHEETS—SHEET 1.

Witnesses
Inventor
John R. Saylor
by his Attorneys
Howson & Howson

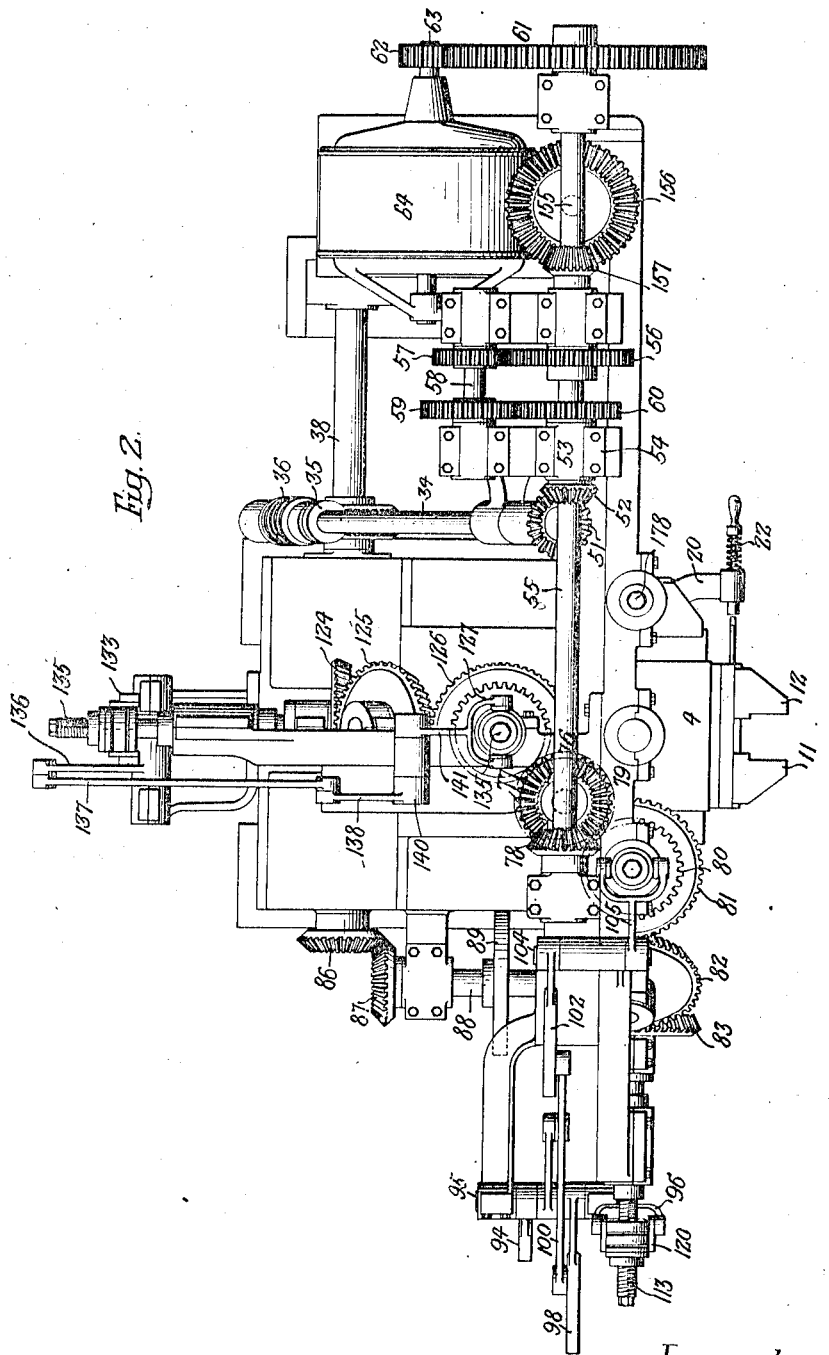

J. R. SAYLOR.
TURRET MACHINE FOR REAMING AND TAPPING.
APPLICATION FILED AUG. 2, 1911.
1,048,352.
Patented Dec. 24, 1912.
10 SHEETS—SHEET 3.
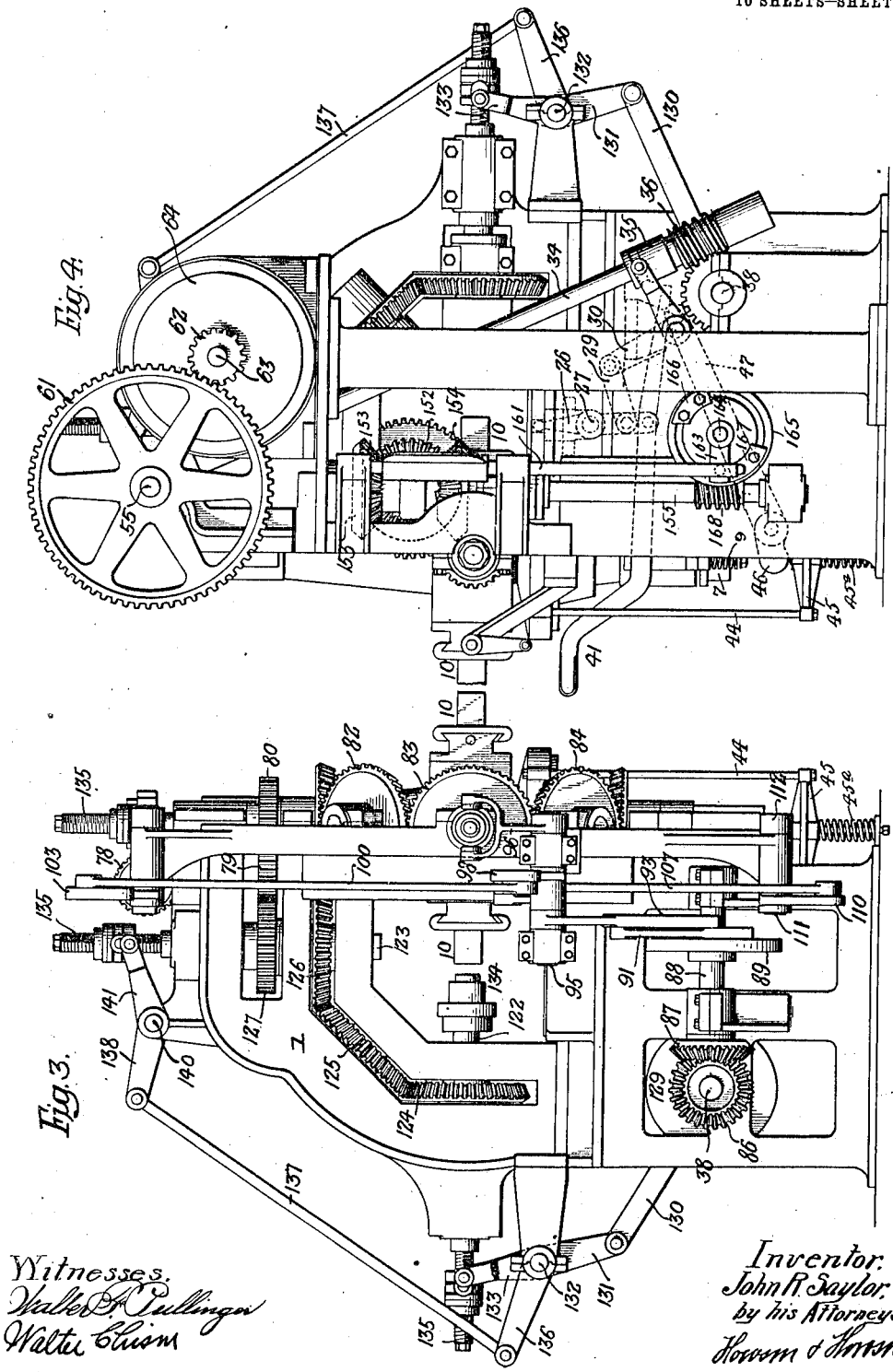

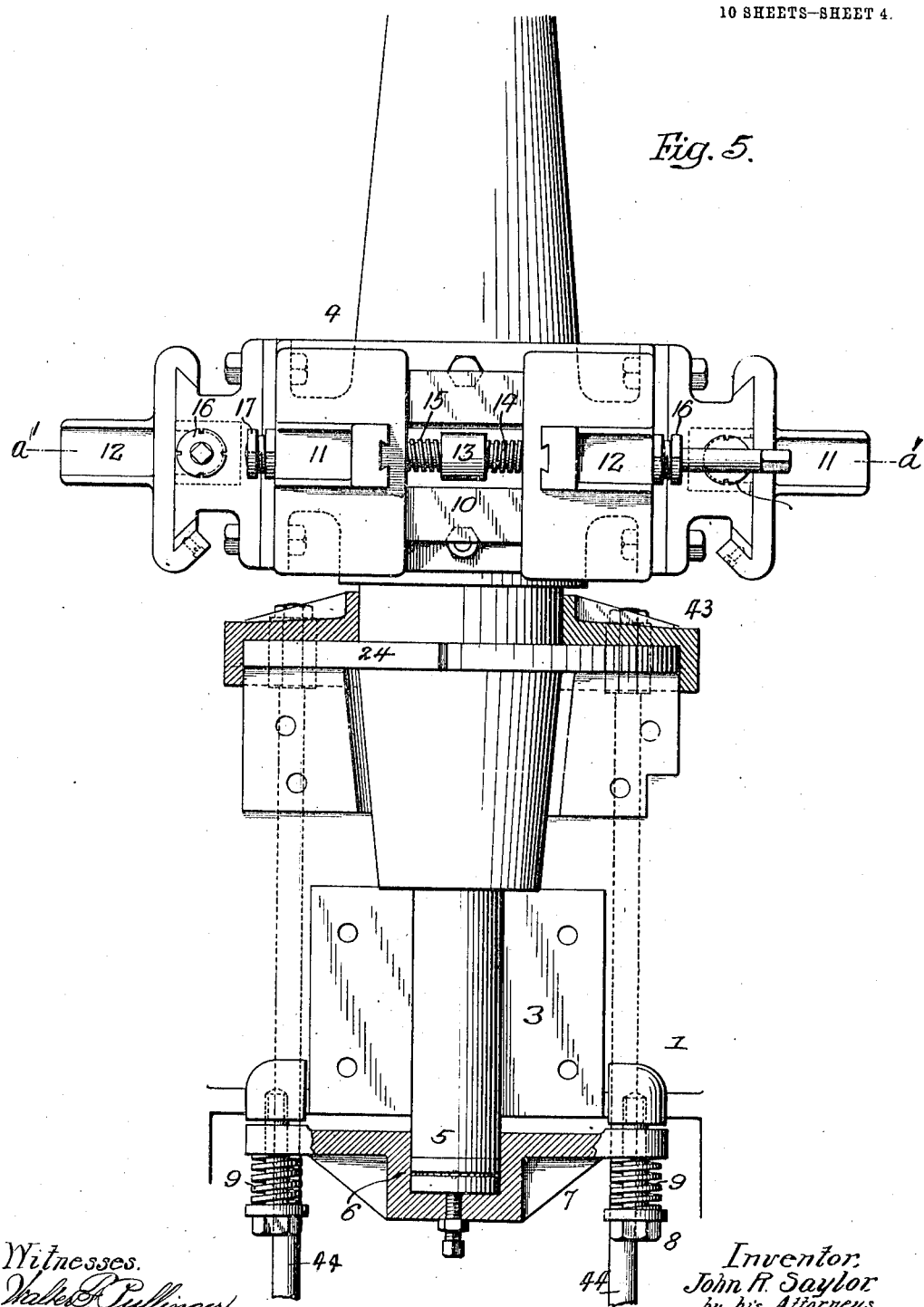

J. R. SAYLOR.
TURRET MACHINE FOR REAMING AND TAPPING.
APPLICATION FILED AUG. 2, 1911.

1,048,352.

Patented Dec. 24, 1912.

10 SHEETS—SHEET 5.

Witnesses.

Inventor,
John R. Saylor.
by his Attorneys,

J. R. SAYLOR.
TURRET MACHINE FOR REAMING AND TAPPING.
APPLICATION FILED AUG. 2, 1911.

1,048,352.

Patented Dec. 24, 1912.
10 SHEETS—SHEET 6.

Witnesses

Inventor
John R. Saylor
by his Attorneys

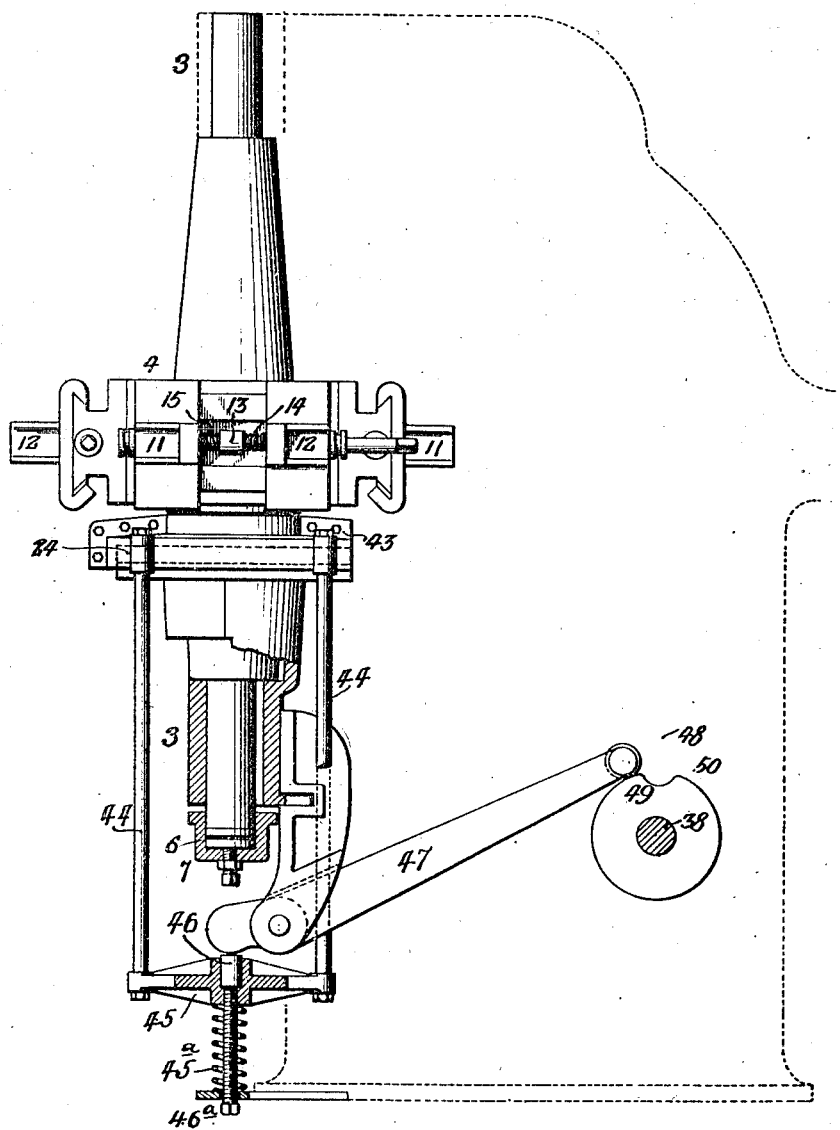

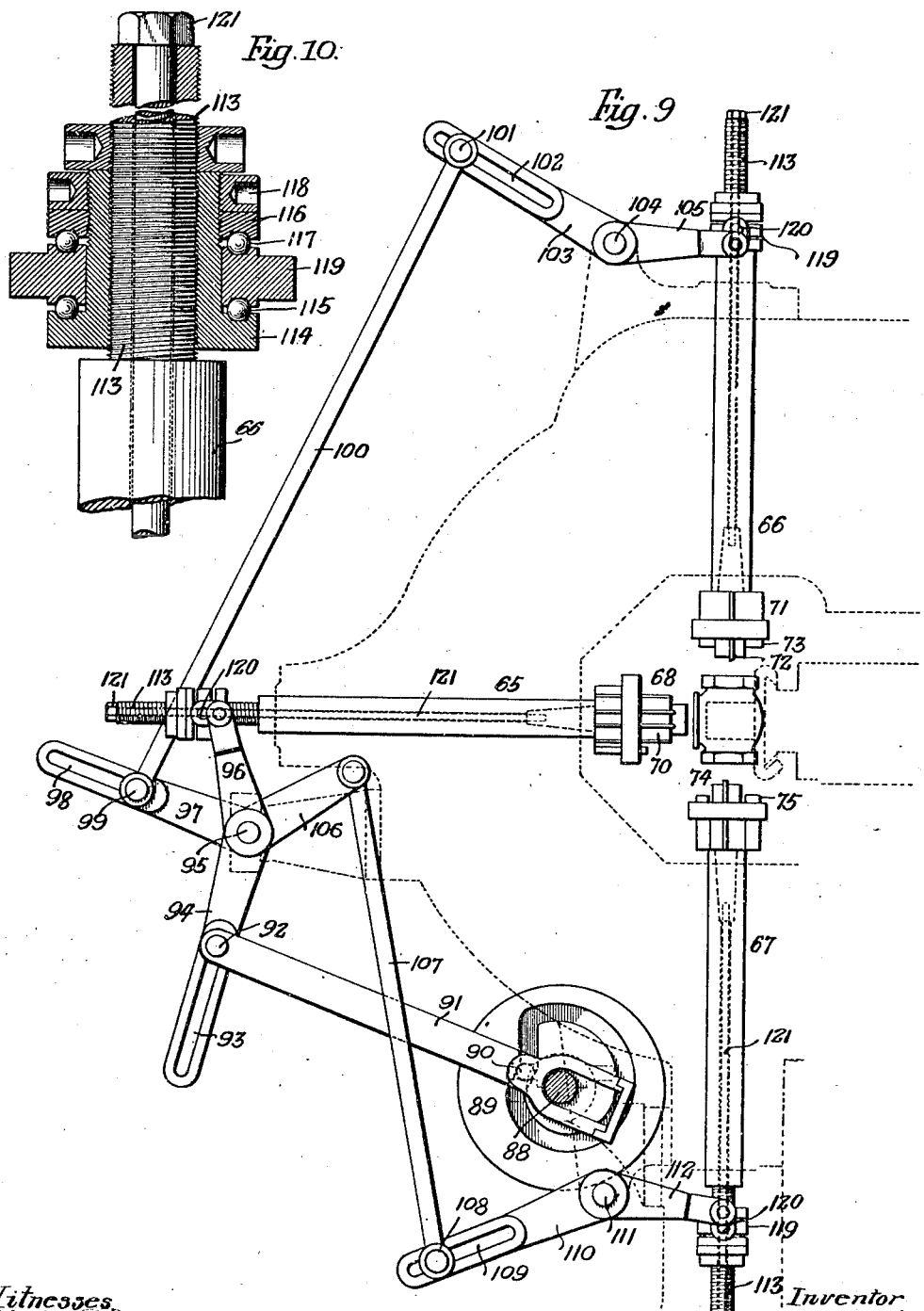

J. R. SAYLOR.
TURRET MACHINE FOR REAMING AND TAPPING.
APPLICATION FILED AUG. 2, 1911.
1,048,352.
Patented Dec. 24, 1912.
10 SHEETS—SHEET 9.
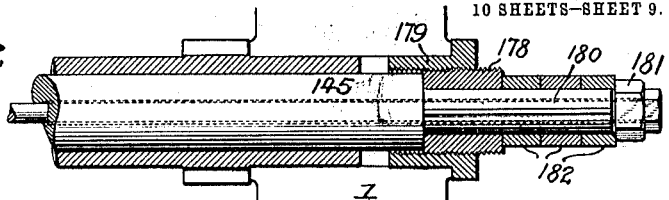
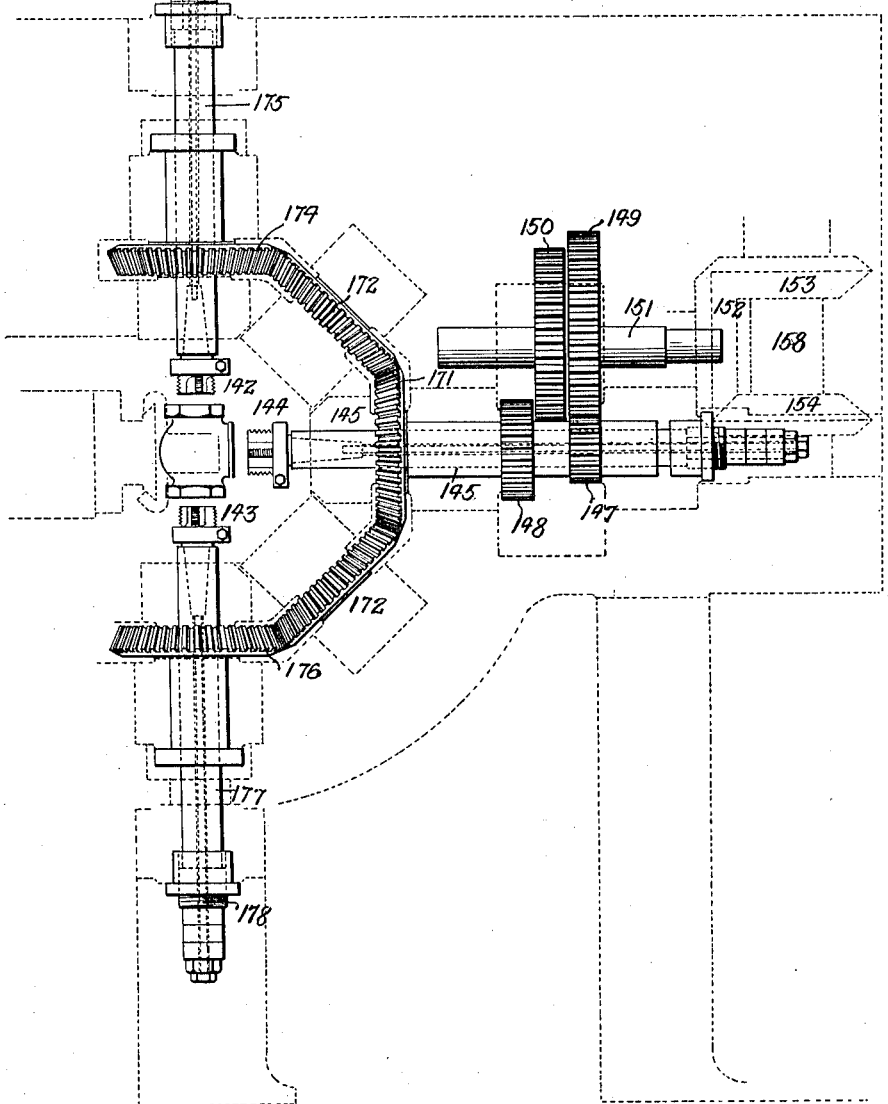
Witnesses.
Inventor:
John R. Saylor,
by his Attorneys,

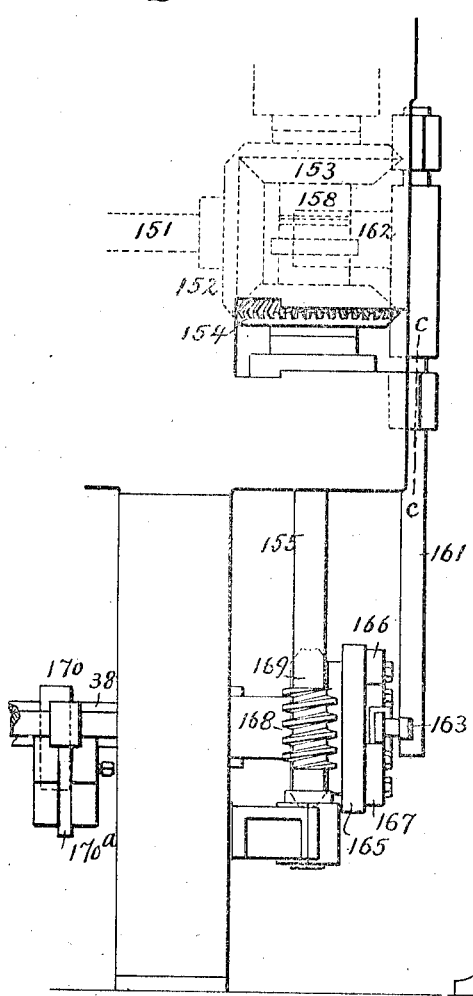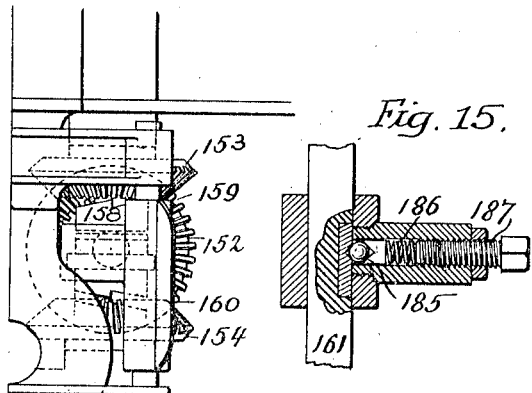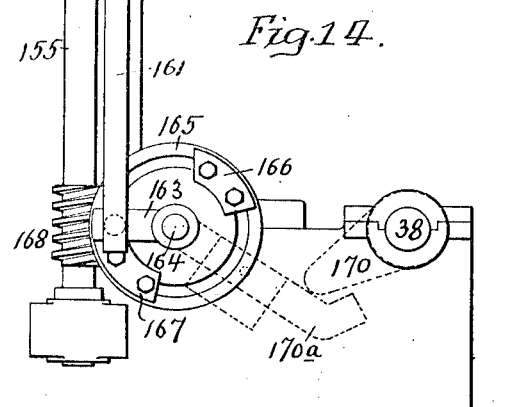

UNITED STATES PATENT OFFICE.

JOHN R. SAYLOR, OF POTTSTOWN, PENNSYLVANIA.

TURRET-MACHINE FOR REAMING AND TAPPING.

1,048,352.

Specification of Letters Patent.

Patented Dec. 24, 1912.

Application filed August 2, 1911. Serial No. 641,961.

*To all whom it may concern:*

Be it known that I, JOHN R. SAYLOR, a citizen of the United States, residing in Pottstown, county of Montgomery, State of Pennsylvania, have invented certain Improvements in Turret-Machines for Reaming and Tapping, of which the following is a specification.

My invention relates to certain improvements in machines for facing, seating and tapping valve casings, also similar work requiring two or three operations to complete.

One object of my invention is to make a machine of this type automatic so that after the operator places the rough casting in the machine, it will be rough reamed, then finished and tapped. After the parts have been completed the valve body or other part can be removed and another rough casting substituted for it.

A further object of the invention is to design the machine so that the reaming and tapping tools are easily accessible.

A still further object of the invention is to provide means whereby the machine can be adjusted to accommodate valve bodies of different sizes.

Figure 1:
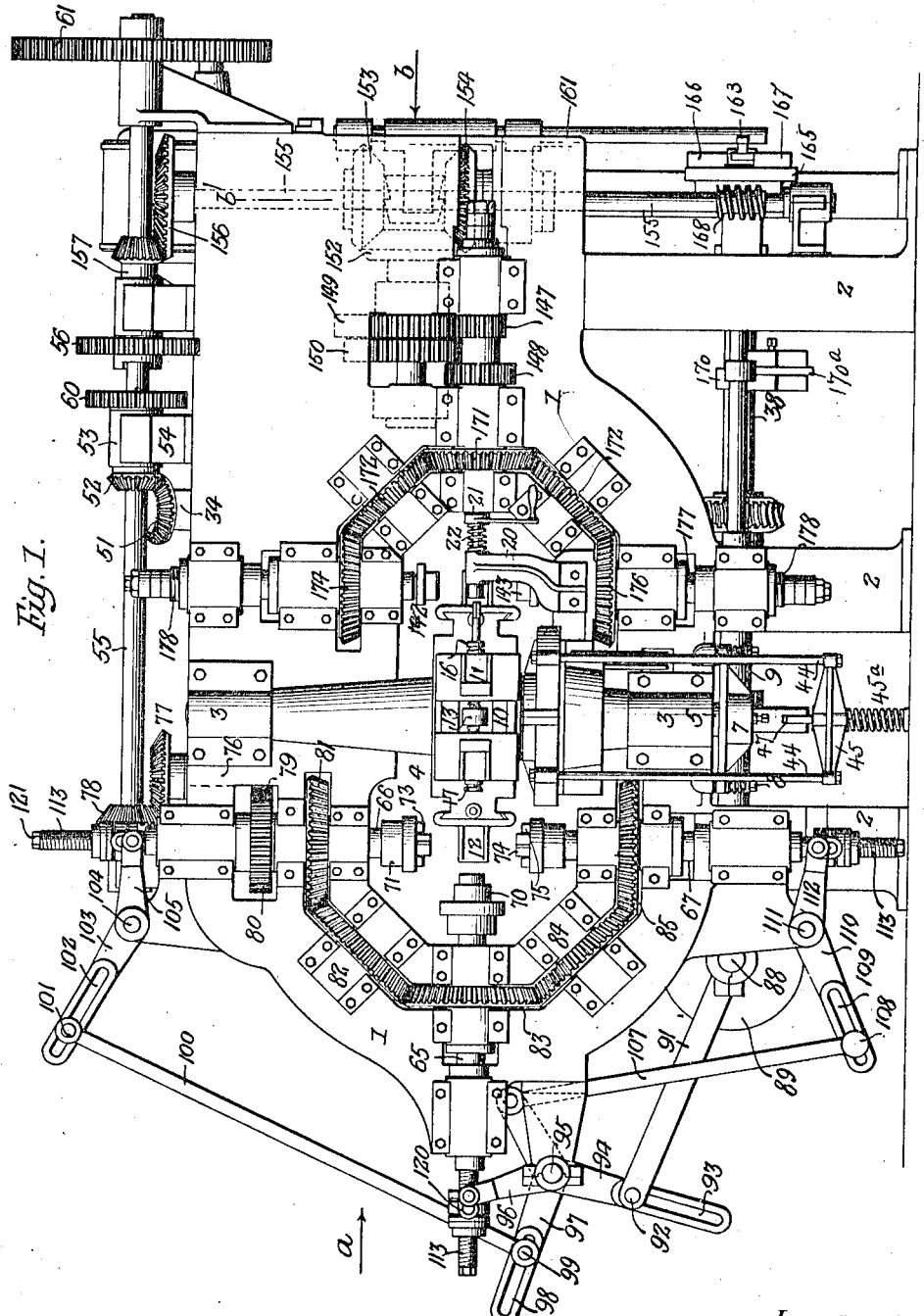
Figure 6:
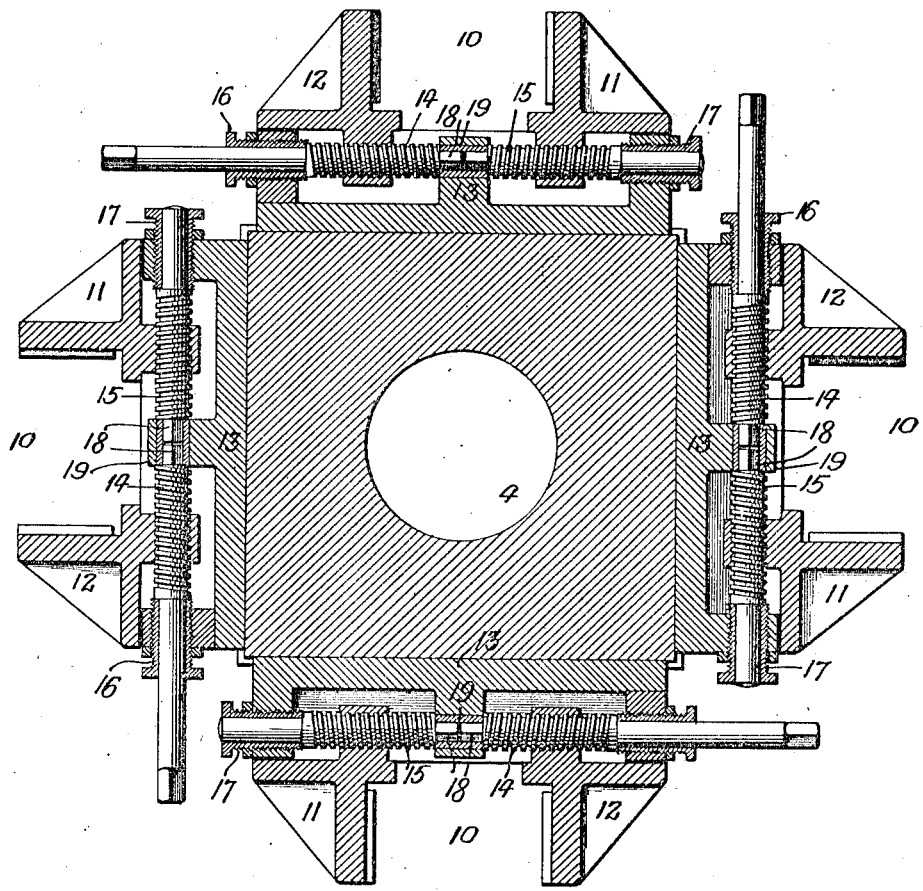
Figures 16, 17, 18:
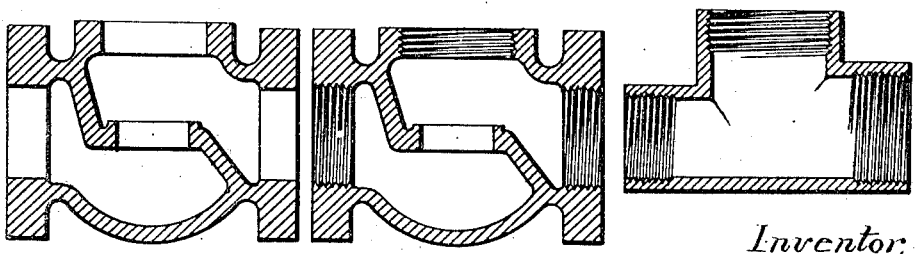
Figure 7:
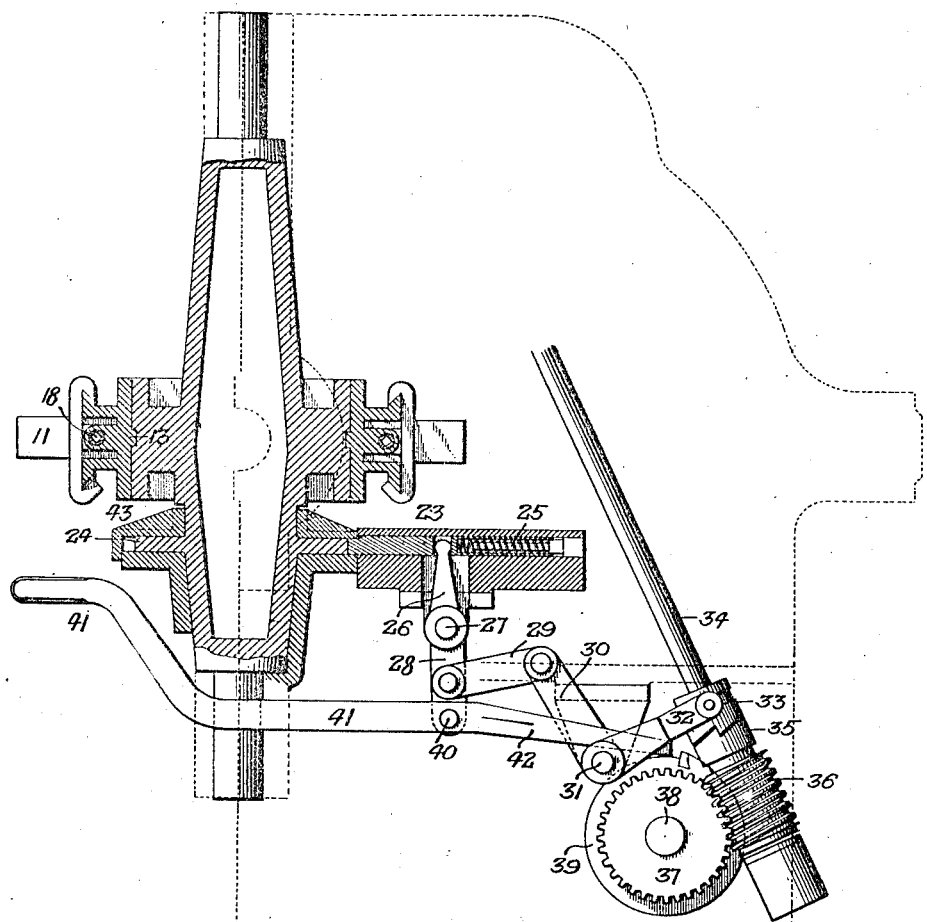

In the accompanying drawings, Figure 1, is a face view of my improved machine for facing, seating and tapping valve casings and like objects; Fig. 2, is a plan view; Fig. 3, is an end view looking in the direction of the arrow *a*, Fig. 1; Fig. 4, is an end view, looking in the direction of the arrow *b*, Fig. 1; Fig. 5, is a view in elevation, with the bearings in section illustrating the turret and chucks; Fig. 6, is a plan view on the line *a'—a'*, Fig. 5; showing the four chucks;
Fig. 7, is a transverse sectional view through the center of the machine illustrating the turret in section and the hand lever by which the mechanism is set in motion; the frame being shown in outline; Fig. 8, is a transverse sectional view illustrating the turret and the mechanism therefor; Fig. 9, is a skeleton view, showing the reaming heads and the mechanism connected thereto; Fig. 10, is a sectional view, showing the means for adjusting the reaming heads to the work; Fig. 11, is a skeleton view illustrating the threading taps and their connections; Fig. 12, is a sectional view illustrating the means for adjusting the threading taps; Fig. 13, is an enlarged view of the right side of the machine, illustrating the shifting mechanism; Fig. 14, is an end view of the mechanism illustrated in Fig. 13; Fig. 15, is an enlarged sectional view on the line *c—c*, Fig. 13; Fig. 16, is a sectional view of a valve body; prior to its insertion in the machine; Fig. 17, is a view of the valve body after being finished in the machine; and Fig. 18, is a view of a threaded T, which can be finished on my improved machine.

It will be understood at the outset that while I have described my invention as used for facing, seating and tapping valves, in which the seat is arranged at right angles to the outlet and inlet; it will be understood that any form of valve may be finished in my improved machine or any other piece requiring two or more operations to complete.

I will briefly describe the operation of the machine: The valve body to be seated, tapped and finished is placed in one of the chucks of the turret; there being four chucks in the present instance. Three bodies are being operated on while a finished one is being removed and a rough blank inserted. The turret makes a quarter revolution and stops automatically and during the interval of rest the three reaming heads are moved forward—reaming the three openings in the valve, when a valve of the type illustrated in Figs. 6 and 7 is being finished. These reaming heads are moved forward automatically and retracted, and, after they are retracted, the turret is moved another quarter turn. During the first interval the finished valve casing is removed from the chucks and another valve body substituted for it. After the valve body has been roughly reamed then the walls of the seat opening and the seat are given a final finishing cut; the seat being ready for the reception of the valve. The turret is moved another quarter turn and the three openings in the body are tapped; completing the operation on the valve body. With the final quarter turn the body is brought to the front of the machine and removed and another one substituted for it.

I is the frame of the machine having supports 2, of any suitable design, and mounted in bearings 3—3, on the frame 1, is a turret 4, clearly shown in Fig. 5. The bearings are heavy so as to withstand the strains to which the turret is subjected. The lower spindle 5 of the turret rests upon ball bearings 6, mounted within a step 7, which is yieldingly secured to the frame 1 through the medium of bolts 8 and springs 9. By turning the bolts 8 the springs 9 can be compressed to any degree desired.

Carried by the turret 4 are four chucks 10. These chucks are duplicates of one another and the jaws 11 and 12 are formed to receive removable fitting holders so as to properly grasp the valve body. If the valve body is of a peculiar design then the jaws are made to conform to it as the body must be properly held on the turret while the several cutters are acting. The jaws 11 and 12 slide on ways on the head 13, which is secured to the turret by suitable bolts, and these jaws are moved toward and from each other by screws 14 and 15. The spindle of the screw 14 extends through threaded bearings 16 and is squared, or otherwise shaped, to receive a handle, or wrench, by which the jaw can be turned. The spindle of the screw 15 passes into a threaded bearing 17. The threaded bearings 16 and 17 are adjustable and bear against the shoulders on the screws, as clearly illustrated in Fig. 6. The two screws have squared ends 18, in the present instance, which are adapted to a loose bearing or sleeve 19 mounted in the head 13. The screws mesh with threads in the lugs on the jaws 11 and 12. By this arrangement one screw is independent of the other in regard to the longitudinal movement, but both screws turn in unison—one being a right hand screw and the other a left hand screw. Consequently, the jaws will be moved toward and from each other, yet there will be no lost motion, as the thrust of each jaw is taken independently by its own bearing—making an exceedingly accurate and substantial chuck. This construction of chuck is set forth and claimed in a patent granted to me on the 14th day of November, 1911, No. 1,008,926, and, therefore, I lay no claim to it in the present application.

In the present instance, I have shown a bracket 20, secured to the frame of the machine on which is a handled key 21, that engages with the end of the spindle of the screw 14. A spring 22 holds the key out of contact with the spindle and when it is wished to turn the chuck the handled key is forced in against the pressure of the spring and the end of the key engages the end of the spindle of the screw and upon turning the handled key the screw can be turned to cause the jaws to move either toward or from each other. The turret is turned a quarter turn by hand, in the present instance, and is held in the position to which it is adjusted by a bolt 23, which enters notches in the disk 24 of the turret. A spring 25 causes the bolt to move toward the turret and a lever 26 mounted on a pivot 27 retracts the bolt when it is wished to turn the turret. On this pivot 27 is mounted an arm 28, Fig. 7, connected by a link 29 to one arm 30 of a bell crank lever, pivoted at 31. The other arm 32 of this lever engages a sliding member of a clutch 33 on a driven shaft 34; the other member 35 of this clutch being secured to the shaft. On the shaft 34 is a worm 36; which meshes with a worm wheel 37 on the shaft 38 on which is also a notched disk 39.

Pivoted at 40 on the end of the arm 28 is a handled lever 41 projecting in front of the machine and having an arm 42, which forms a stop for the notched disk 39 so that when the arm 42 of the lever is in the position illustrated in Fig. 7, the disk will force the lever in the direction of its arrow; causing the arm 28 to withdraw the bolt 23; thus releasing the turret and at the same time throwing the clutch member out of mesh with the clutch member 35, which stops the machine.

In order to rigidly hold the turret in the position to which it is adjusted, while the tools are acting, I provide a friction plate 43, which rests upon the surface of the disk 24 and connected to this plate by rods 44 is a head 45, Fig. 8. In this head is a block 46 against which rests the short arm of a lever 47 pivoted to the bracket on the frame. On the long arm of the lever 47 is a roller 48, which is engaged by a cam 49 having a notch 50. This cam is on the shaft 38. When the tools are acting the friction plate is held upon the upper surface of the disk 24 by the cam 49, but when the notch 50 is directly under the roller 48, then the friction disk is released from the control of the cam and when the bolt 23 is withdrawn the turret can be turned by hand.

Mounted between a plate at the base of the machine and the head 45 is a spring 45$^a$ and located under the block 46 is an adjusting screw 46$^a$.

The diagonal shaft 34, which drives the shaft 38, has a beveled gear wheel 51, Figs. 1 and 4, which meshes with a gear wheel 52 mounted on a sleeve adapted to the bearing 54. The main driving shaft 55 extends through this sleeve. Secured to the driving shaft is a gear wheel 56, which meshes with a pinion 57, Fig. 2, on an intermediate shaft 58 adapted to bearings on the frame of the machine and on the shaft 58 is a gear wheel 59, which meshes with the gear wheel 60 on the sleeve 53 forming a change gear; the gear wheels of which can be altered to change the speed of the shaft. On the end of the main driving shaft 55 is a gear wheel 61, Fig. 4, which meshes with a pinion 62 on the shaft 63 of the motor 64, mounted on the frame of the machine. By this construction the timed mechanism is actuated through the shafts 34 and 38, but the tools are driven direct from the main driving shaft 55.

I will now describe the mechanism for driving and feeding the first set of tools for reaming and facing the valve casing. Referring in the first instance, to Figs. 1, 3 and 9, in which 65, 66 and 67 are three spindles. The spindles 66 and 67 are in line with each other while the spindle 65 in the present instance, is at right angles to the other two spindles. The heads carried by the spindles 66 and 67 ream the openings, in the present instance, in each end of the valve, which is finally screw threaded for the reception of the threaded ends of the pipe, while the head on the spindle 65 reams the opening for the reception of the cap of the valve. The cutter head 68 on the spindle 65 has cutters 70, which ream the walls of the opening for the cap of the valve and may have cutters for rough cutting the seat, as well as the surface of the valve casing. While the cutter head 71 on the spindle 66 has cutters 72, which ream the opening in one end of the valve casing and cutters 73 which face the valve casing, similar cutters 74 and 75 on the spindle 67 cut the same surface at the opposite end of the valve casing. These spindles are driven through the main shaft 55 through a shaft 76 geared to the shaft 55 by bevel gears 77, 78, and to the spindle 66 by gearing 79 and 80, Fig. 1, and on this spindle 66 is a bevel gear wheel 81, which meshes with an intermediate wheel 82 on a shaft having its bearings in the frame 1 and this intermediate gear wheel meshes with another bevel wheel 83 on the spindle 65 and this bevel wheel meshes with an intermediate wheel 84 mounted on a shaft having its bearings on the frame of the machine and this intermediate wheel meshes with a beveled gear wheel 85 on the spindle 67. The connections between the several gear wheels 81, 83 and 85, with their spindles, are such that while their spindles must turn with the gear wheels, they are free to move longitudinally therein. By this construction, all of the spindles turn in unison and are driven from the main shaft, but the movement toward and from the work is controlled by the shaft 38.

On the end of the shaft 38, Fig. 2, is a bevel gear 86, which meshes with a bevel gear wheel 87 on a shaft 88, mounted in bearings in the frame of the machine. On the shaft 88 is a cam disk 89 having a cam groove cut in one face thereof, as clearly illustrated in Fig. 9, and extending into the cam groove is a pin 90 on a bar 91, which spans the shaft 88 and has a pin 92, which enters a slot 93 in a lever 94. The pin can be set at any point desired in this slot so as to give more or less throw to the lever 94.

The lever 94 is mounted on a shaft 95 having its bearings in the frame of the machine and on the shaft is an arm 96, which is forked at its outer end to span the end of the spindle 65. This arm is connected to the spindle so that on the movement of the arm the head 68 will be moved to and from the work. Also on the shaft 95 is an arm 97 having a slot 98 and adapted to the slot is an adjustable pin 99 to which is pivoted a connecting rod 100. This rod has a pin 101, which is adjustable in the slot 102 on an arm 103 secured to a shaft 104, and on this shaft is a forked arm 105, which spans the spindle 66, and is connected to said spindle so as to move it to and from the work in unison with the movement of the spindle 65. By adjusting the pins 99 and 101 in their slots more or less movement can be imparted to the spindle 66. On the shaft 95 is a third arm 106 to which is pivoted a rod 107. On the opposite end of this rod is a pin adjustably mounted on a slot 109 on an arm 110, secured to a shaft 111, and on this shaft is a forked arm 112, which spans the spindle 67 and is connected thereto. As the cam 89 is turned, the cutter heads are moved to and from the work through the above described mechanism.

The several forked arms are connected to their spindles in the manner clearly illustrated in Fig. 10, and the end of each rod is threaded, as at 113, and mounted on the threaded portion of the spindle is a screw threaded flanged sleeve 114 forming a ball race for the set of balls 115. The periphery of this sleeve 114 is also threaded for the reception of a ring 116 having a race for a set of balls 117. A jam nut 118 positively holds the ring in position, after adjustment. Between the two sets of balls is a collar 119 having races for both sets of balls and this collar has pins at each side to which are coupled the links 120, which in turn are coupled to the forked levers. By this construction the several spindles are firmly held to their respective levers, but are allowed to turn freely, due to the presence of the ball bearings.

The reamer heads each have tapered shanks, shown by dotted lines in Fig. 9, which fit in tapered sockets in each of the spindles, and in order to hold these heads to the spindle, I provide long bolts 121, which are threaded at their inner ends and enter threaded openings in the ends of the tapered shanks of the cutter heads. By this arrangement, the cutter heads can be drawn tightly to their seats and the bolt can be turned from the outside; the head of the bolt being mounted on the extreme end of the spindle.

I will now refer to the mechanism directly back of the turret, which is used for finishing the seat in the valve in the present instance (see Fig. 3).

122 is a spindle adapted to bearings in the frame 1 and arranged horizontally. 123 is a spindle arranged vertically. The horizontal spindle is used only when a valve body of the type illustrated in Fig. 16 is to be finished and the spindle 123 is used only when a right angled valve is to be finished. On the spindle 122 is a bevel gear wheel 124 meshing with an intermediate wheel 125, which, in turn, meshes with a beveled gear wheel 126 on the spindle 123. Both of these spindles slide in their respective gear wheels, but must turn with them. On the hub of the wheel 126, or on a sleeve secured to the hub, is a gear wheel 127, which meshes with a gear wheel 79 on the shaft 76, driven from the main shaft 55. Longitudinal motion is imparted to the spindles 122 and 123 by lever mechanism actuated from the shaft 38. On this shaft is a cam 129, which actuates a rod 130, connected to an arm 131 on a rock shaft 132 adapted to bearings in the frame of the machine. On the shaft 132 is a forked arm 133, which spans the spindle 122 and is connected thereto by mechanism similar to the connections of the other spindles to their operating arms so that as the cam rotates the spindle 122 will be moved to and from the work.

The cutter head 134 is secured to the spindle in the same manner and the other heads by a long bolt 135 and has a cutter for the seat of the valve as well as for the face of the valve. On the rock shaft 132 is an arm 136 which is connected by a rod 137 to an arm 138 on the rock shaft 140, having a forked arm 141, which spans the vertical spindle 123 and is connected to it in a manner similar to the manner in which the arm 133 is connected to its spindle. In the drawings, the cutter head is not shown, as this spindle is out of action in finishing the particular valve shown in Fig. 16.

I will now describe the mechanism for cutting the screw threads in the several openings of the valve. Referring to Figs. 1 and 11, when the turret is moved to the third and last position, the valve body, held in the turret, is brought in line with the taps 142, 143 and 144. These taps have tapered shanks similar to the cutting heads and are held to their respective spindles by long bolts in the same manner as the other heads. The tap 144 is mounted on the end of a horizontal spindle 145. This spindle passes through a sleeve 146 on which are two pinions 147 and 148. Arranged to mesh with these pinions are two gear wheels 149 and 150 on a shaft 151. These gears are arranged to slide on the shaft 151 so that they can be thrown into mesh with their respective pinions. In the present instance, the wheel 149 is in gear with the wheel 147.

On the end of the shaft 151 is a bevel gear wheel 152, which meshes with two bevel gear wheels 153 and 154, Figs. 13 and 14, loose on a vertical shaft 155 which has at its upper end a bevel gear wheel 156 meshing with a pinion 157, on the main horizontal shaft 55 from which the taps or dies are driven.

On the vertical shaft 155 is a clutch sleeve 158, keyed to the shaft so that it will always turn with it, but will be free to slide on the shaft. On each end of the sleeve is a clutch face. The upper clutch face is arranged to engage a clutch face 159 on the gear wheel 153 and the lower clutch face is arranged to engage a clutch face 160 on the gear wheel 154. The sleeve is shifted by a shifter rod 161, having an arm 162 which engages the sleeve so that on vertically moving the shifter rod 161 the clutch sleeve can be thrown into engagement with the clutch face of either of the bevel gear wheels 153 and 154, or locked in a central position clear of either clutch face. This shifter rod 161 is connected at its lower end to an arm 163 on a shaft 164 and loose on this shaft is a disk 165 having an annular undercut groove in one face in which the blocks 166 and 167 are adjustably mounted. The blocks contact with the arm 163 and shift it to cause the clutch to engage one or the other of the gears 153, 154. The disk is driven in the present instance from the shaft 155 by a worm 168 and worm wheel 169. On the shaft 38 is a cam 170 which contacts with an arm 170ᵃ secured to the shaft 164 and this cam automatically shifts the arm and holds it in mid position when the machine is at rest.

185 is a bolt in the form of a ball which engages the rod 161 and holds it in its raised position. The ball is backed by a V-block and back of this is a spring 186 which rests against a set screw 187, Fig. 15.

On the spindle 145 is a bevel gear wheel 171, which meshes with two intermediate gears 172 and 173. The intermediate gear 172 meshes in turn with the gear wheel 174 on the spindle 175, while the gear wheel 173 meshes with a gear wheel 176 on the spindle 177. These several gear wheels 171, 174, and 176 are splined to their respective spindles, thus allowing the spindles to move longitudinally independently of the gear wheels. It will be seen by the above construction that the three spindles are driven from one controlling shaft.

In order to feed the several taps to the work and to retract the taps after the threads have been cut, I place on each spindle a block 178, Fig. 12, having a master thread thereon, which meshes with the thread on a bushing 179, mounted in the frame 1. This block is prevented from turning on the spindle 145 by a key 180 and is held in place by a nut 181 and between the nut and the block are a series of spacing washers 182 so that the master block and bushing can be removed and replaced and the block can be adjusted on the spindle when it is desired to alter the pitch or character of the threads to be cut in the valve body.

Each spindle 145, 175 and 177, is provided with a master block 178, as clearly shown in Fig. 11, so that when the arm 163 shifts the clutch sleeve 158 into engagement with one of the bevel wheels, the spindles are turned in one direction, feeding the spindles forward and when the taps come in contact with the valve casing they cut the threads in the walls of the openings to any depth desired, which is controlled by the stops on the disk 165, and when the desired depth is reached the clutch sleeve is automatically thrown into contact with the teeth on the other bevel gear wheel; the several spindles being reversed, while the master threaded blocks retract the spindles until they are clear of the valve body, after which the cam shaft 38 is automatically stopped and the turret can be again rotated.

The operation of the machine is as follows:—In the first place, it will be seen that all the spindles are turned from the main horizontal shaft 55, and the reciprocating movement of the spindles is imparted through the cam shaft 38. In the present instance, there are four sets of jaws on the turret so that three valve bodies are in process of completion while the operator removes a finished valve body and substitutes another one in the rough. The turret is turned by hand from one position to another and locked in the several positions to which it is adjusted so as to bring the openings in the several valve bodies in proper alinement with the spindles carrying the cutter heads. The first quarter turn of the turret brings the valve body in alinement with the first reaming tool heads which ream the several openings in the valve body and prepare them for finishing and tapping. After the valve body is reamed, the turret is turned another quarter turn; bringing it in line with the seating or finishing tool head, which, in the present instance, is carried by the horizontal spindle 122, which cuts the seat in the valve body and may finish the head or flange in the valve body. Upon turning the turret another quarter turn it will bring the valve body in line with the taps which will enter the openings and cut the several screw threads. On the final quarter turn the completed valve body is in position to be removed and by moving the key 21 into engagement with the spindle of the screw of the chuck jaws, and upon turning the key, the valve body will be released and will drop on the floor and another valve body can be clamped in its place.

The entire mechanism is automatic with the exception of the means for turning the turret and applicant has found that it is preferable to have the operator do this portion of the work, rather than rely upon the automatic mechanism, but automatic mechanism may be used without departing from the essential features of the invention.

I claim:

1. The combination in a machine for reaming, seating and tapping, of a frame; a turret mounted in said frame; chucks mounted on the turret; a reaming head; means for rotating said head; means for moving the head to and from the work; a finishing head; means for turning the head; means for moving it to and from the work; a tapping head; means for rotating said tapping head; said elements being spaced apart and so arranged in respect to the turret that work secured to the turret, as the turret is intermittently turned, will be first rough reamed, then finished therein, and finally threaded.

2. The combination of a frame; a turret rotatably mounted thereon; clutch jaws mounted on the turret for holding the work; a series of reaming heads; one or more finishing heads; and a series of tapping heads; means for rotating the several heads; a common shaft to which all of the said rotating means are geared; with means for moving the reaming heads and finishing heads to and from the work; with a cam shaft controlling the said means.

3. The combination of a frame; a turret mounted thereon; a series of chucks mounted on the turret; means for locking the turret in the position to which it is adjusted; a series of spindles; a reaming head mounted on each spindle; lever mechanism for moving the spindles to and from the work carried by one of the chucks of the turret; a cam shaft; a single cam thereon for controlling the movement of all the spindles through the lever mechanism; a main power shaft; gearing connected to the several spindles and geared to the main power shaft so as to rotate the several spindles.

4. The combination of a frame; a turret mounted thereon; a series of chucks mounted on the turret; means for locking the turret in the position to which it is adjusted; a series of spindles; a reaming head mounted on each spindle; lever mechanism for moving the spindles to and from the work; a cam shaft; a cam thereon for controlling the movement of the lever mechanism; a main power shaft; gearing connecting the several spindles and all geared to the main power shaft so as to rotate the several spindles; a finishing die; lever mechanism for feeding the finishing die to and from the work; a cam on said cam shaft for actuating said lever mechanism; means for rotating said finishing die geared to the main driving shaft; a series of tapping dies; spindles on which the dies are mounted; means for rotating said spindles; and means for positively moving the spindles forward and for retracting them; with a cam on the cam shaft controlling the said means.

5. The combination in a frame; of a work-carrier mounted thereon; a horizontal spindle mounted on the frame and two vertically arranged spindles, also mounted on the frame; gear wheels through which the spindles extend; said gear wheels being connected to the spindles so that while the spindles must turn with the gear wheels, they are free to slide therein; gearing by which the said gear wheels turn in unison; a driving shaft from which the said gear wheels are driven; a cam shaft; a cam thereon; a bar having a pin engaging the cam; a rock shaft having an arm connected to the bar; said rock shaft having three other arms; one of said arms being directly connected to the horizontal spindle; the other two arms being indirectly connected through rods and levers to the spindles so that as the cam shaft is turned the spindles will be moved in unison to and from the work.

6. The combination in a frame, of a work-carrier mounted thereon; a horizontal shaft and two vertical spindles; cutter heads on each spindle; a cam shaft; a cam thereon; a bearing having a pin engaging the cam; a rock shaft having a slotted arm to which the bar is adjustably secured; a forked arm connected to the horizontal shaft; a slotted arm on the rock shaft; a lever having a forked arm engaging the upper horizontal shaft and also having a slotted arm; a rod adjustably connected to the two slotted arms; a fourth arm on the rock shaft; a lever having a forked arm engaging the vertical spindle and also having a slotted arm; a rod connecting the fourth arm of the rock shaft with the said slotted arm of the lever; the parts being so combined that while the spindles are moved to and from the work in unison, the movement of the spindles in respect to each other can be repeated.

7. The combination in a series of spindles; means for rotating said spindles; a shaft; two gears loose on the shaft; both gears meshing with the mechanism for driving the said spindles; a clutch sleeve mounted between the two gears and having a clutch face on each end thereof; each of said gears having a clutch face; a shifter rod engaging the sleeve; an arm to which the rod is connected; a disk having a block arranged to strike said arm and shift it; means for driving the said disk from the said driving shaft; a shaft on which said arm is mounted; a second arm on said shaft; and a driven shaft having a cam arranged to engage the last mentioned arm and move the clutch sleeve to the central position.

8. The combination in a turret machine; of a turret; chucks mounted in the turret; a frame; bearings in the frame for the turret; with a friction plate; a cam shaft; a cam thereon; a lever controlled by the cam and connected to the friction plate so that after the turret is turned to a given position the cam forces the friction plate in contact with the turret holding the turret in position to which it is adjusted.

9. The combination of a frame; bearings thereon; a turret mounted in the bearings; chucks on the turret; a flange on the turret; a friction plate mounted above the flange; a head connected to said plate; a cam shaft upon which the cam is mounted; a lever pivoted to the frame and arranged to be actuated by the cam; said lever having an arm engaging the head so that when the turret is moved to the position to which it is adjusted, the cam actuates the lever to draw the friction plate down upon the flange of the turret.

10. The combination of a frame; a turret mounted therein; a notched flange mounted on a portion of the turret; a spring-actuated bolt entering a notch in the flange and holding the turret in the position to which it is adjusted; a shaft; an arm on the shaft engaging the bolt; a second arm on the shaft; a hand lever pivotally mounted on the second shaft and extending to the front of the machine and having an arm; a notched disk; a cam shaft on which the disk is mounted; the said disk having a projection arranged to contact with the arm on the hand lever; a driving shaft; gearing between the driving shaft and the cam shaft; a clutch sleeve on the driving shaft and arranged to couple the shaft with the gearing; a bell crank lever; one arm of the said bell crank lever being connected to the clutch sleeve; and a link connecting the other arm with the arm of the shaft to which the hand lever is connected so that, when the hand lever is moved by the action of the disk, it will withdraw the bolt and automatically disconnect the driving shaft from the cam shaft.

11. The combination in a turret machine for facing, seating and tapping valve bodies or other articles, of a turret; spindles; cutter heads on the spindles; a cam shaft controlling the movement of the several spindles; a driving shaft for said cam shaft; a clutch loose on the driving shaft; a worm wheel on the cam shaft; a clutch on the driving shaft; means for operating the clutch; a disk having a projection; a pivotally mounted lever arranged to be engaged by the disk; means connecting the operating lever with the clutch so that when the disk reaches a certain point it comes in contact with the operating lever and automatically throws the machine out of action by releasing the clutch.

12. The combination in a turret machine, for reaming, seating and tapping valve bodies or other articles, of a turret; a series of chucks thereon for holding the work; a screw stem for each chuck; a bracket on the frame of the machine; a key on the bracket arranged to engage the screw stem when projected; a handle on the key; and a coiled spring tending to hold the key out of contact with the spindle of the screw stem so that when the key is in a normal position the turret is free to be turned.

In testimony whereof I have signed my name to this specification, in the presence of two subscribing witnesses.

JOHN R. SAYLOR.

Witnesses:
 WM. E. SHUPE,
 WM. A. BARR.